(12) United States Patent
Francisco et al.

(10) Patent No.: US 8,668,593 B2
(45) Date of Patent: Mar. 11, 2014

(54) SHAFT WITH SHOULDER AND GROOVE

(75) Inventors: Jay M. Francisco, Chula Vista, CA (US); Jang Y. Jo, Chula Vista, CA (US); Matthew Gorajski, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 13/446,349

(22) Filed: Apr. 13, 2012

(65) Prior Publication Data
US 2013/0274023 A1  Oct. 17, 2013

(51) Int. Cl.
*F16C 3/02* (2006.01)
(52) U.S. Cl.
USPC ............................................. 464/180
(58) Field of Classification Search
USPC ............. 464/179, 180, 183; 415/216.1; 60/39.091, 796, 799; 277/358, 370, 277/371, 374, 375, 393, 397
See application file for complete search history.

(56) References Cited

U.S. PATENT DOCUMENTS

| 2,599,575 | A | * | 6/1952 | Morgan ........................ 464/179 |
| 3,631,585 | A | * | 1/1972 | Stamm ...................... 464/179 X |
| 4,406,459 | A | | 9/1983 | Davis et al. |
| 4,406,460 | A | | 9/1983 | Slayton |
| 5,058,904 | A | | 10/1991 | Nevola |
| 5,462,489 | A | * | 10/1995 | Kan et al. ...................... 464/179 |
| 8,408,555 | B2 | * | 4/2013 | Garrison ................... 277/370 X |
| 2011/0272892 | A1 | | 11/2011 | Grace et al. |
| 2012/0133099 | A1 | * | 5/2012 | Fesl ............................... 277/358 |

FOREIGN PATENT DOCUMENTS

WO  WO 2011009596 A1 *  1/2011

* cited by examiner

*Primary Examiner* — Gregory Binda
*Assistant Examiner* — Josh Skroupa
(74) *Attorney, Agent, or Firm* — Kinney & Lange, P.A.

(57) ABSTRACT

A shaft includes a shoulder that transitions the shaft from a first diameter to a second diameter. The shaft includes a groove that is disposed immediately adjacent to and/or is formed in an inner radial portion of the shoulder. The groove acts to produce uniform deflection of the shoulder in an axial direction with respect to a centerline axis of the shaft.

16 Claims, 4 Drawing Sheets

SHAFT WITH SHOULDER AND GROOVE

BACKGROUND

The present invention relates to turbomachinery, and more particularly to a shaft design for turbomachinery.

The rotating shafts of turbomachinery are supported from a non-rotating structure by arrays of anti-friction bearings. In many engines, anti-friction bearings are enclosed in bearing compartments that allow the anti-friction bearings to be more easily lubricated and cooled.

Bearing compartments can be sealed around the shaft by various types of seals including a rotary face seal assembly with a seal element and a mating ring. The mating ring is mounted on the shaft to rotate therewith and has a contact face which slidably engages and interfaces with the stator carbon seal. In many cases, the carbon seal is movable (axially relative to the shaft) against and away from the mating ring by springs and air pressure. Typically, the interfacing surfaces that comprise the contact faces of the mating ring and the carbon seal are lubricated to minimize friction and wear.

The bearing and other components of the bearing compartment including the carbon seal and the mating ring are cooled and lubricated by oil supplied from other locations in the gas turbine engine. Typically, this oil weeps out from the cooperating seal faces and the oil must be removed or scavenged utilizing various techniques. Excessive weepage of oil from the bearing compartment is not desirable.

One construction utilizes a nut which places the mating ring in compression against a shoulder of the shaft. This configuration results in forces that deflect the shoulder and mating ring in an axial direction relative to a centerline of the shaft. The deflection of the mating ring results in tilting and/or distortion of the contact face of the mating ring relative to the contact face of the carbon seal. This misalignment of the contact faces results in excessive wear of the sealing contacts and/or weepage and loss of oil from the bearing compartment.

SUMMARY

A shaft includes a shoulder that transitions the shaft from a first diameter to a second diameter. The shaft includes a groove that is disposed immediately adjacent to and/or is formed in an inner radial portion of the shoulder. The groove acts to produce a more uniform deflection of the shoulder in an axial direction with respect to a centerline axis of the shaft.

In another aspect, an assembly includes a mating ring and a shaft. The shaft has a shoulder that transitions the shaft from a first diameter to a second diameter. The mating ring is mounted to the shaft to abut the shoulder. The shaft includes a groove that is disposed immediately adjacent to and/or is formed in an inner radial portion of the shoulder. The groove acts to produce a more uniform deflection of the shoulder in an axial direction with respect to a centerline axis of the shaft.

In yet another aspect, a turbomachine includes a seal assembly and a shaft. The shaft has a shoulder that transitions the shaft from a first diameter to a second diameter. At least a portion of the seal assembly is mounted to the shaft to abut the shoulder. The shaft includes a groove that is disposed immediately adjacent to and/or is formed in an inner radial portion of the shoulder. The groove acts to produce a more uniform deflection of the shoulder in an axial direction with respect to a centerline axis of the shaft.

DETAILED DESCRIPTION

The invention relates to a shaft with at least two diameters connected by a generally radially extending shoulder. The shaft includes a groove or notch disposed immediately adjacent to and/or is formed in an inner radial base portion of the shoulder. The groove can have various configurations, including a configuration where the groove extends primarily axially with respect to a centerline of the shaft, a configuration where the groove extends primarily radially with respect to a centerline of the shaft, or configurations therebetween. This includes a groove with a combined axial and radial extent. The groove reduces localized stiffness of the shoulder. This results in a more uniform axial deflection (with respect to the centerline axis of the shaft) of the shoulder and a mating ring along a radial length of the shoulder and mating ring. Thus, axial tilt and distortion of the shoulder and mating ring are reduced. The reduction in tilt and distortion of the mating ring reduces tilt and misalignment at the seal faces between the mating ring and a face seal, which results in a reduction in seal element wear and/or loss of oil from the bearing compartment.

Figure 1:
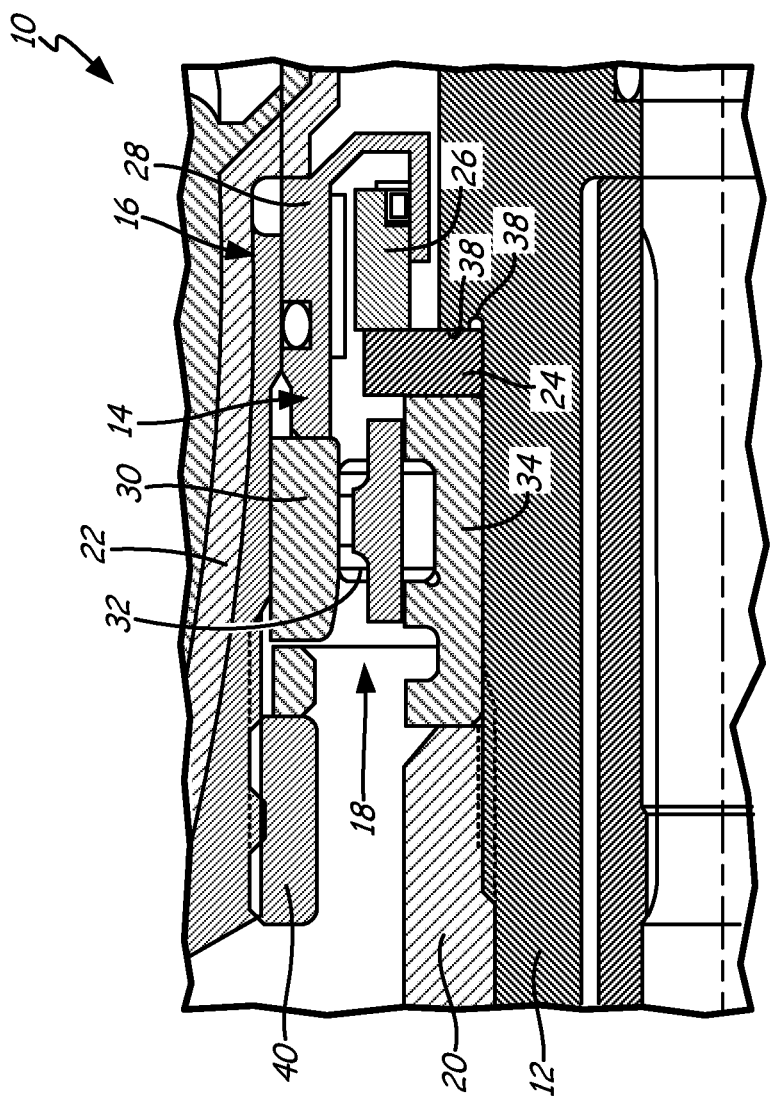
FIG. 1 is a partial cross-section of a turbomachine which includes a shaft with a shoulder and a groove.

FIG. 1 shows a partial cross-section of a turbomachine 10 such as a gas turbine engine, which includes a shaft 12, a bearing compartment 14, and a seal assembly 16. Bearing compartment 14 includes a bearing assembly 18, a nut 20, and a housing 22. Seal assembly 16 includes a mating ring 24, a face seal 26, and a carrier or retaining element 28. Bearing assembly 18 includes an outer race 30, a bearing element 32, and an inner race 34. Shaft 12 includes a shoulder 36 and a groove 38.

Shaft 12 is rotatable about centerline axis A. Bearing compartment 14 comprises the area immediately radially outward of shaft 12. In addition to shaft 12, bearing compartment 14 is bounded by stator portions of turbomachine 10 such as housing 22. Housing 22 acts to support bearing assembly 18 as well as portions of seal assembly 16. Seal assembly 16 is positioned radially outward of shaft 12 and occupies a portion of bearing compartment 14. Bearing assembly 18 is mounted to shaft 12 within bearing compartment 14.

In the embodiment shown, nut 20 is disposed on shaft 12 and is affixed thereto. Nut 20 abuts a first side of bearing assembly 18. Mating ring 24 is disposed on shaft 12 and abuts a second side of bearing assembly 18. Mating ring 24 extends radially outward away from shaft 12 and interfaces and cooperates with face seal 26 to form a seal. Face seal 26, in one embodiment a carbon seal, is retained by carrier 28, which is movably connected to stationary housing 22. Housing 22 supports bearing assembly 18 via outer race 30, which connects to thereto. Bearing element 32 is retained between outer race 30 and inner race 34.

As shown, shoulder 36 is abutted by mating ring 24. Shoulder 36 extends generally radially with respect to centerline axis A of shaft 12 allowing shaft 12 to increase in diameter adjacent seal assembly 16. Groove 38 is formed within shaft 12 in an inner radial base portion of shoulder 36.

Outer nut 40 contacts a portion of outer race 30 and holds outer race 30 in a desired position relative housing 22 and other components of turbomachine 10. Outer nut 40 can be removed for assembly and repair of bearing assembly 18 and bearing housing 22.

Face seal 26 is mounted to carrier 28 and is disposed to interface with mating ring 24. Unlike face seal 26, which is axially movable, mating ring 24 is mounted on shaft 12 and is compressed by nut 20 against shoulder 36. Thus, nut 20 acts to clamp inner race 34 and mating ring 24 in compression when assembled. When assembled, mating ring 24 extends to cooperate with face seal 26 to form a seal therebetween.

Figure 1A:
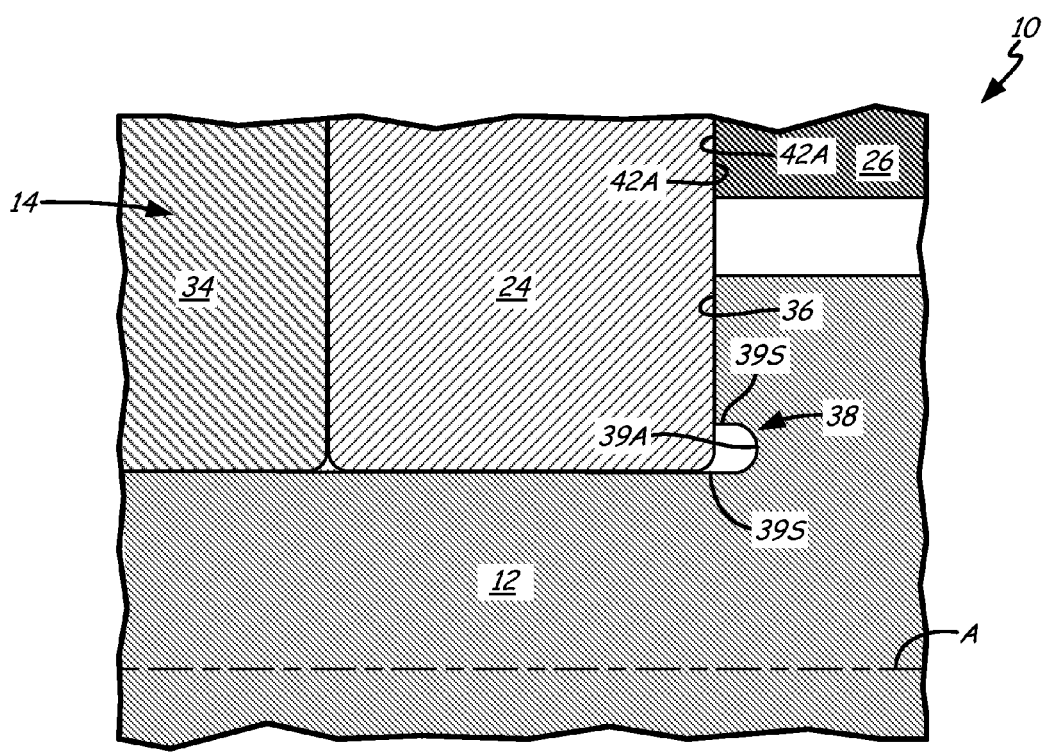
FIG. 1A is an enlarged cross-section of the turbomachine of FIG. 1.

FIG. 1A shows an enlarged portion of a cross-section of a turbomachine 10 including shaft 12, inner race 34, mating ring 24, and face seal 26. Additionally, FIG. 1A illustrates a seal face 42A of mating ring 24 and a seal face 42B of face seal 26. Groove 38 includes generally axial segments 39S connected by an arcuate portion 39A. As shown in FIGS. 1 and 1A, groove 38 is formed in inner radial base portion of shoulder 36 and extends primarily axially (having a largest dimension in the axial direction rather than the radial direction) with respect to a centerline axis of shaft 12. Seal face 42A interfaces with and cooperates with seal face 42B.

The size of shoulder 36 and groove 38 will vary from embodiment to embodiment and will be dependent upon various factors including operational criteria such as the stiffness of the shaft 12, the rotational speed of shaft 12, and a clamping force applied by nut 20. The shape of groove 38 also can vary from embodiment to embodiment. For example, groove 38 can be continuous circumferentially around entire shaft 12 in one embodiment and discontinuous having distinct separate portions in other embodiments. A desired size and shape of shoulder 36 and groove 38 can be verified utilizing finite element analysis.

In one embodiment, clamping force of 3000 lbs (13.4 kN) is applied by nut 20 and shaft rotates at 60,000 rpm. Shaft 12 has a first diameter of about 1.0 inches (25.4 mm) to inner extent of shoulder 36 and has a larger second diameter of about 1.25 inches (31.8 mm) to outer radial extent of shoulder 36. In this embodiment, groove 38 has a maximum depth in the axial direction (with respect to the centerline axis A of shaft 12) of about 0.05 inches (1.27 mm) and has a radius of curvature in arcuate portion 39A of about 0.02 inches (0.51 mm). The width of the groove 38 in the radial direction is about 0.04 inches (1.02 mm).

As discussed previously, nut 20 acts to clamp inner race 34 and mating ring 24 in compression when assembled. Mating ring 24 is clamped to abut shoulder 36. Groove 38 reduces localized stiffness of shoulder 36. This results in a more uniform axial deflection of the shoulder 36 and mating ring 24 with respect to the centerline axis A of shaft 12 along the radial length of shoulder 36 and mating ring 24. Thus, axial tilt and distortion of shoulder 36 and mating ring 24 are minimized. The reduction in tilt and distortion of mating ring 24 reduces tilt and misalignment of seal face 42A relative to seal face 42B, which results in a reduction in wear of the seal faces 42A and 42B and/or weepage of oil from bearing compartment 14.

Figure 2:
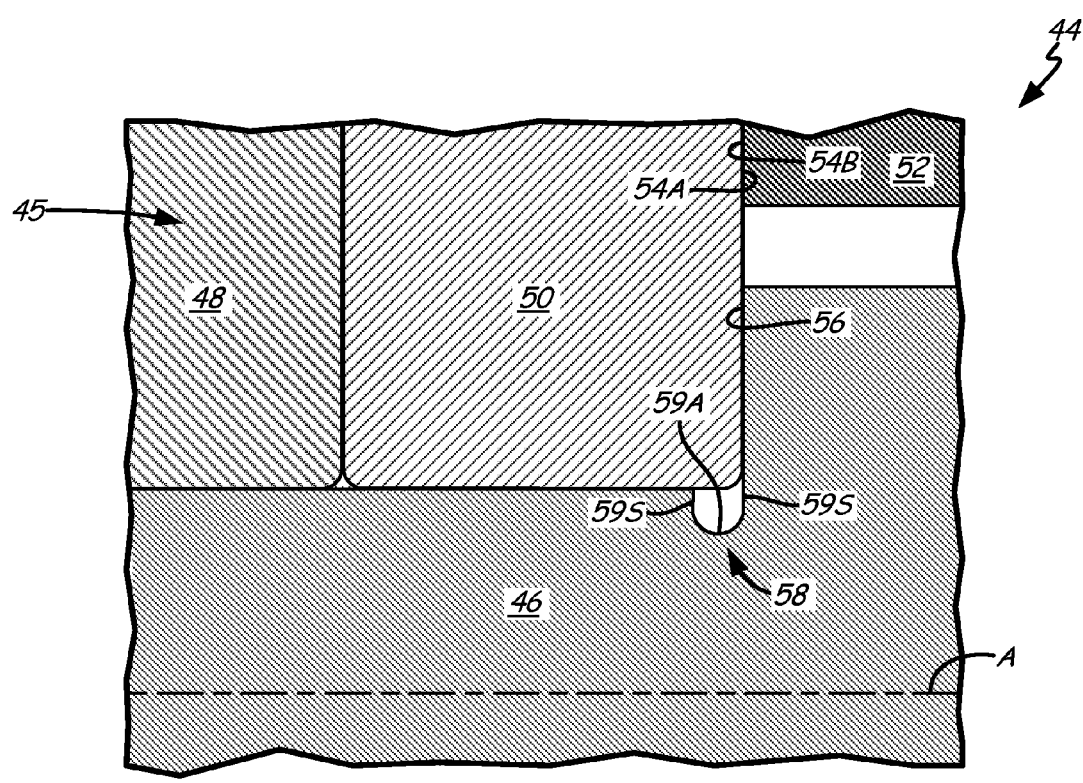
FIG. 2 is an enlarged cross-section of a second embodiment of the turbomachine which includes a shaft with a second embodiment of the groove.

FIG. 2 shows an enlarged portion of a cross-section of a second embodiment of a bearing compartment 45 of a turbomachine 44 including a shaft 46, an inner race 48, a mating ring 50, and a face seal 52. FIG. 2 illustrates a seal face 54A of mating ring 50 and a seal face 54B of face seal 52. As shown in FIG. 2, a groove 58 is formed in shaft 46 immediately adjacent an inner radial base portion of a shoulder 56. Groove 58 includes generally radial segments 59S connected by an arcuate portion 59A. Groove 58 extends primarily radially (having a largest dimension in the radial direction rather than the axial direction) with respect to a centerline axis A of shaft 46. Seal face 54A interfaces with and cooperates with seal face 54B.

In one embodiment, clamping force of 3000 lbs (13.4 kN) is applied to mating ring 50 and shaft 46 rotates at 60,000 rpm. Shaft 46 has a first diameter of about 1.0 inches (25.4 mm) to inner extent of shoulder 56 and has a second larger diameter of about 1.25 inches (31.8 mm) to outer radial extent of shoulder 56. In this embodiment, groove 58 has a maximum depth in the radial direction (with respect to centerline axis A of shaft 46) of about 0.05 inches (1.27 mm) and has a radius of curvature in an arcuate portion 59A of about 0.02 inches (0.51 mm). The width of the groove 58 in the axial direction is about 0.04 inches (1.02 mm).

Mating ring 50 is clamped to abut shoulder 56. Groove 58 reduces localized stiffness of shoulder 56. This results in a more uniform axial deflection of the shoulder 56 and mating ring 50 with respect to the centerline axis A of shaft 46 along the radial length of shoulder 56 and mating ring 50. Thus, axial tilt and distortion of shoulder 56 and mating ring 50 are minimized. The reduction in tilt and distortion of mating ring 50 reduces tilt and misalignment of seal face 54A relative to seal face 54B, which results in a reduction in weepage of oil from bearing compartment 45.

Figure 3:
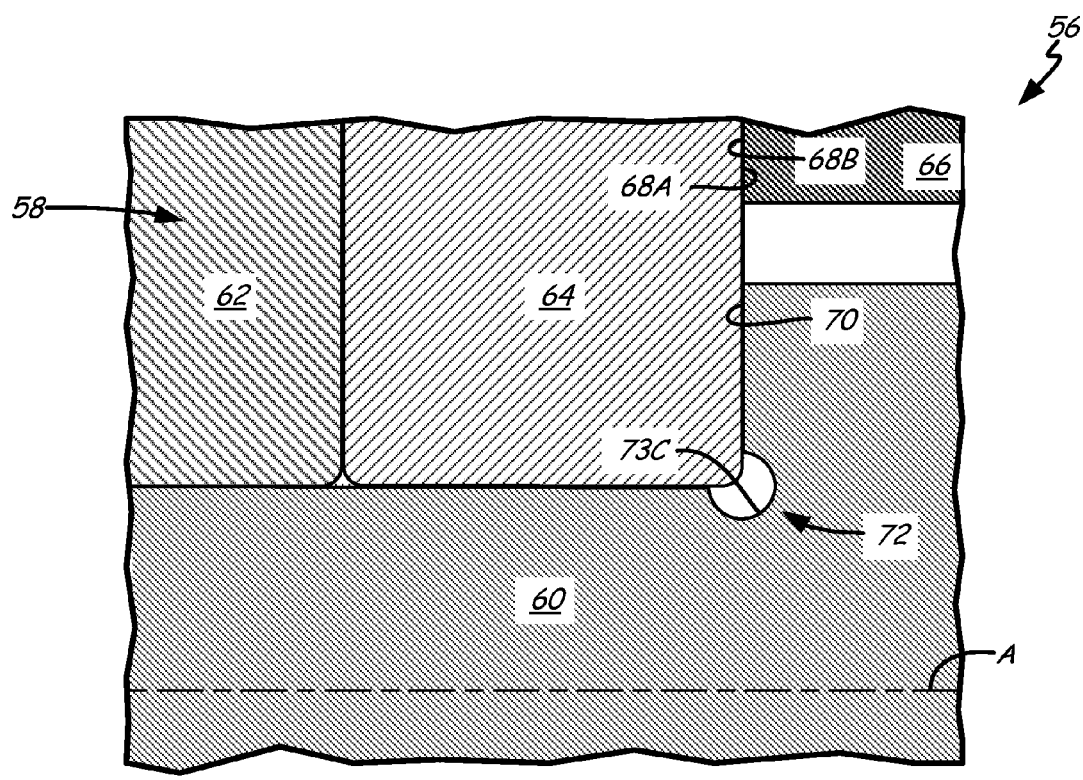
FIG. 3 is an enlarged cross-section of a third embodiment of the turbomachine which includes a shaft with a third embodiment of the groove.

FIG. 3 shows an enlarged portion of a cross-section of a third embodiment of a bearing compartment 58 of a turbomachine 56 including a shaft 60, an inner race 62, a mating ring 64, and a face seal 66. FIG. 3 illustrates a seal face 68A of mating ring 64 and a seal face 68B of face seal 66. As shown in FIG. 3, a groove 72 is formed in shaft 60 immediately adjacent to and extending into an inner radial base portion of a shoulder 70. In the embodiment shown, groove 72 includes an partial circular portion 73C that extends for substantially 270°. Groove 72 has partially circular shape and extends both axially and radially with respect to a centerline axis A of shaft 60. Seal face 68A interfaces with and cooperates with seal face 68B.

In one embodiment, clamping force of 3000 lbs (13.4 kN) is applied to mating ring 64 and shaft 60 rotates at 60,000 rpm. Shaft 60 has a first diameter of about 1.0 inches (25.4 mm) to inner extent of shoulder 70 and has a second larger diameter of about 1.25 inches (31.8 mm) to outer radial extent of shoulder 70. In this embodiment, groove 72 has a maximum depth in the radial direction (with respect to centerline axis A of shaft 46) of about 0.025 inches (0.64 mm), a maximum depth in the axial direction (with respect to centerline axis A of shaft 46) of about 0.025 inches (0.64 mm), and has a radius of about 0.02 inches (0.51 mm).

Mating ring 64 is clamped to abut shoulder 70. Groove 72 reduces localized stiffness of shoulder 70. This results in a more uniform axial deflection of the shoulder 70 and mating ring 64 with respect to the centerline axis A of shaft 60 along the radial length of shoulder 70 and mating ring 64. Thus, axial tilt and distortion of shoulder 70 and mating ring 64 are minimized. The reduction in tilt and distortion of mating ring 64 reduces tilt and misalignment of seal face 68A relative to seal face 68B, which results in a reduction in weepage of oil from bearing compartment 58.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A shaft comprising:
 a shoulder extending in a radial direction with respect to a centerline axis of the shaft and transitioning the shaft from a first diameter section to a second larger diameter section;
 a groove formed in both the first diameter portion of the shaft and an inner radial portion of the shoulder of the shaft, wherein the groove acts to produce uniform deflection along a length of the shoulder in an axial direction with respect to the centerline axis of the shaft, wherein the groove extends primarily radially with respect to the centerline axis of the shaft, and wherein the groove is disposed immediately adjacent to the inner radial portion of the shoulder.

2. The shaft of claim 1, wherein the groove includes an arcuate portion.

3. An assembly comprising:
 a shaft including a shoulder extending in a radial direction with respect to a centerline axis of the shaft, the shoulder transitioning the shaft from a first diameter to a second diameter, wherein the shaft includes a groove formed in the shaft, the groove disposed immediately adjacent to and/or formed in an inner radial base of the shoulder of the shaft, wherein the groove acts to produce uniform deflection along a length of the shoulder in an axial direction with respect to the centerline axis of the shaft;
 a mating ring mounted to the shaft to abut a face of the shoulder;
 a face seal including a contact face that is substantially co-planar with and concentric to the face of the shoulder; and
 wherein the mating ring includes a contact face configured to interface and slidably engage the contact face of the face seal, and wherein the contact face of the mating ring is substantially co-planar with the face of the shoulder.

4. The assembly of claim 3, wherein the face seal comprises a carbon seal.

5. The assembly of claim 3, wherein the groove includes an arcuate portion.

6. The assembly of claim 3, wherein groove extends primarily axially with respect to the centerline axis of the shaft and wherein the groove extends into the inner radial portion of the shoulder.

7. The shaft of claim 3, wherein the groove extends primarily radially with respect to the centerline axis of the shaft and wherein the groove is disposed adjacent to the inner radial portion of the shoulder.

8. The shaft of claim 3, wherein the groove extends both axially and radially with respect to the centerline axis of the shaft.

9. The shaft of claim 8, wherein the groove has a partially circular shape.

10. A turbomachine comprising:
 a shaft including a shoulder extending in a radial direction with respect to a centerline axis of the shaft, the shoulder transitions the shaft from a first diameter to a second diameter, wherein the shaft includes a groove formed in the shaft, the groove disposed immediately adjacent to and/or formed in an inner radial base of the shoulder of the shaft, and wherein the groove acts to produce uniform deflection along a length of the shoulder in an axial direction with respect to the centerline axis of the shaft;
 a bearing assembly disposed on the shaft; and
 a seal assembly including a portion mounted to the shaft and abutting the shoulder, the portion of the seal assembly being positioned between the bearing assembly and the shoulder.

11. The turbomachine of claim 10, wherein the groove includes an arcuate portion.

12. The turbomachine of claim 10, wherein the groove extends primarily axially with respect to the centerline axis of the shaft and wherein the groove extends into the inner radial portion of the shoulder.

13. The turbomachine of claim 10, wherein the groove extends primarily radially with respect to the centerline axis of the shaft and wherein the groove is disposed adjacent to the inner radial portion of the shoulder.

14. The turbomachine of claim 10, wherein the groove extends both axially and radially with respect to the centerline axis of the shaft.

15. The turbomachine of claim 10, further comprising:
 a face seal including a contact face that is substantially co-planar with and concentric to a face of the shoulder; and
 wherein the seal assembly includes a contact face configured to interface and slidably engage the contact face of the face seal, and wherein the contact face of the seal assembly is substantially co-planar with the face of the shoulder.

16. A shaft comprising:
 a shoulder extending in a radial direction with respect to a centerline axis of the shaft and transitioning the shaft from a first diameter section to a second larger diameter section;
 a groove formed in both the first diameter portion of the shaft and an inner radial portion of the shoulder of the shaft, wherein the groove acts to produce uniform deflection along a length of the shoulder in an axial direction with respect to the centerline axis of the shaft;
 wherein the groove extends both axially and radially with respect to the centerline axis of the shaft;
 wherein the groove has a partially circular shape; and
 wherein the groove extends circularly from a surface of the first diameter section to a surface of the shoulder.

* * * * *